(12) United States Patent
Stirn

(10) Patent No.: US 10,266,988 B2
(45) Date of Patent: Apr. 23, 2019

(54) DEVICE FOR PREPARING A SUBSTANCE

(71) Applicant: PGA Putz-Granitzer-Anlagenbau Gesellschaft m.b.H., Wernberg (AT)

(72) Inventor: Christian Stirn, Puch (AT)

(73) Assignee: PGA PUTZ-GRANITZER-ANLAGENBAU GESELLSCHAFT M.B.H., Wernberg (AT)

( * ) Notice: Subject to any disclaimer, the term of this patent is extended or adjusted under 35 U.S.C. 154(b) by 697 days.

(21) Appl. No.: 14/794,930

(22) Filed: Jul. 9, 2015

(65) Prior Publication Data

US 2016/0024716 A1 Jan. 28, 2016

(30) Foreign Application Priority Data

Jul. 22, 2014 (AT) .................. A 581/2014
Jun. 15, 2015 (AT) .................. A 380/2015

(51) Int. Cl.
  *D21B 1/34* (2006.01)
  *D21B 1/32* (2006.01)
  *D21H 11/18* (2006.01)

(52) U.S. Cl.
  CPC ............. *D21B 1/345* (2013.01); *D21B 1/32* (2013.01); *D21H 11/18* (2013.01); *Y02W 30/646* (2015.05)

(58) Field of Classification Search
  CPC ......... D21B 1/345; D21B 1/347; D21B 1/342
  See application file for complete search history.

(56) References Cited

U.S. PATENT DOCUMENTS

| 1,923,888 A | 8/1933 | Robinson |
| 2,823,871 A | 2/1958 | Larsson |
| 2,954,174 A | 9/1960 | Polleys |

(Continued)

FOREIGN PATENT DOCUMENTS

| AT | 510753 B1 | 1/2013 |
| CN | 101094955 | 12/2007 |

(Continued)

OTHER PUBLICATIONS

Nov. 11, 2015, EP communication issued for related EP application No. 15450027.6.

(Continued)

*Primary Examiner* — Anthony Calandra
(74) *Attorney, Agent, or Firm* — Young & Tthompson

(57) ABSTRACT

A device (1) for preparing a substance suspension, in particular a pulp suspension, with a container (2), with stator sheets (30) provided in the interior of the container and designed as baffles, and with a rotor (4) in the container, on which rotor a dispersing disk (8) is provided, includes an annular displacement element (20) provided in the interior of the container (2), an element whose outside surface (22) is some distance from the inside surface (23) of the wall (24) of the container (2). The inner opening (21) of the displacement element (20) that is arranged coaxially to the rotor is hopper-like, whereby the expanded area of the opening points to the cover (3) of the container (2). The stator sheets provided in the container span the channel (25) between the exterior (22) of the displacement element (20) and the interior (23) of the wall (24) of the container.

10 Claims, 7 Drawing Sheets

(56) References Cited

U.S. PATENT DOCUMENTS

| | | | | |
|---|---|---|---|---|
| 3,946,951 | A | * 3/1976 | Danforth | B02C 18/0092 |
| | | | | 241/21 |
| 4,129,259 | A | * 12/1978 | Vokes | D21B 1/345 |
| | | | | 209/250 |
| 2003/0042344 | A1 | 3/2003 | Fisch et al. | |

FOREIGN PATENT DOCUMENTS

| | | |
|---|---|---|
| CN | 101992191 | 3/2011 |
| DE | 2722906 A1 | 11/1978 |
| DE | 102012217304 | 4/2014 |
| EP | 1287878 A2 | 3/2003 |
| EP | 2284313 A1 | 2/2011 |
| GB | 1468775 A | 3/1977 |

OTHER PUBLICATIONS

Austrian Office Action dated Apr. 17, 2015 in corresponding Austrian Patent Application with English translation of Austrian Office Action.

Austrian Office Action dated Nov. 6, 2015 in corresponding Austrian Patent Application with English translation of Austrian Office Action.

TW Search Report for Application No. 104123535, dated Nov. 20, 2018, with English translation provided.

* cited by examiner

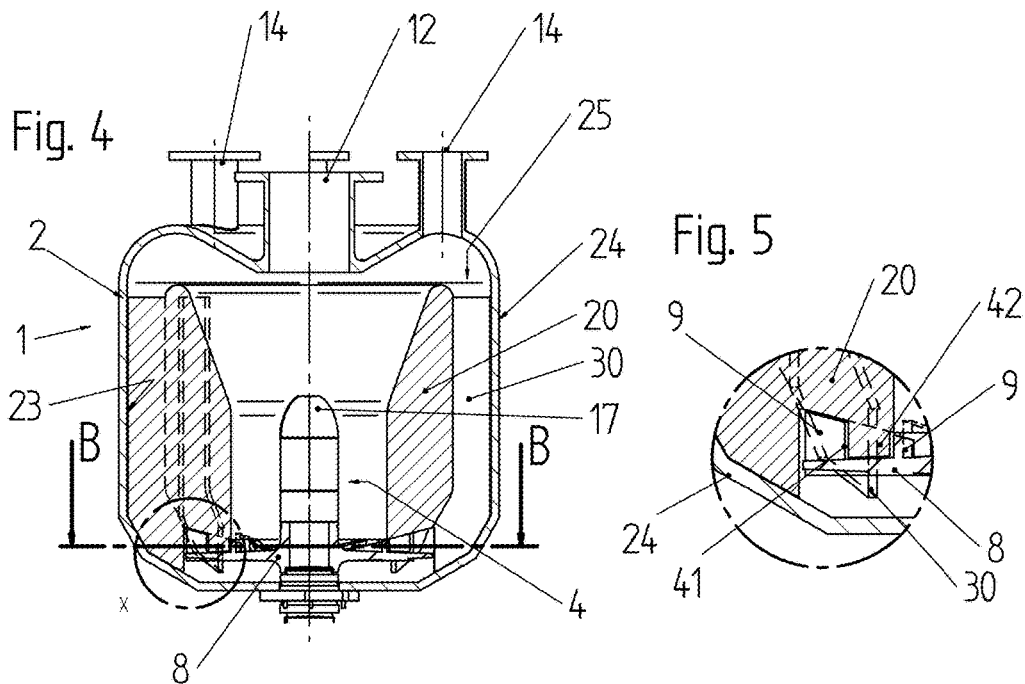
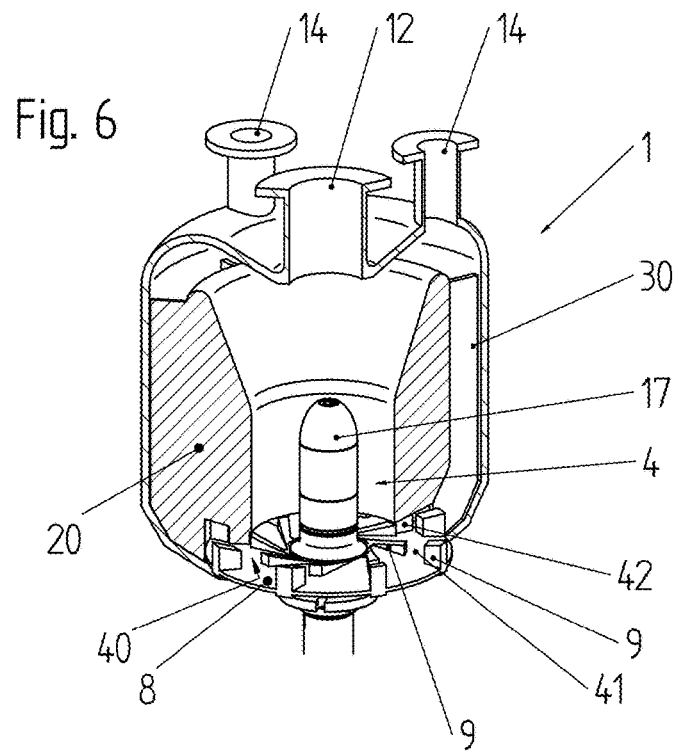

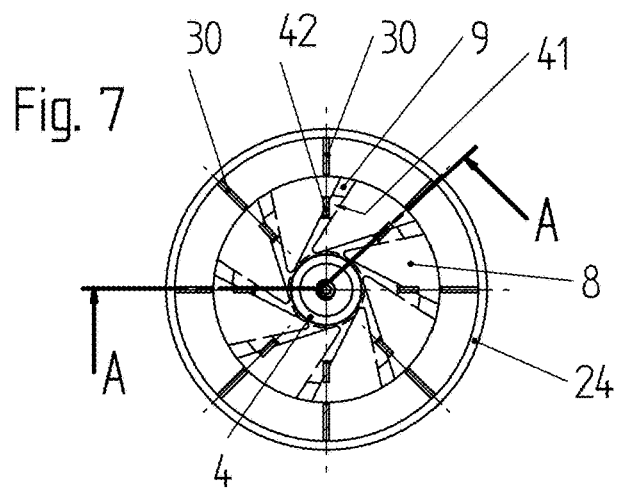
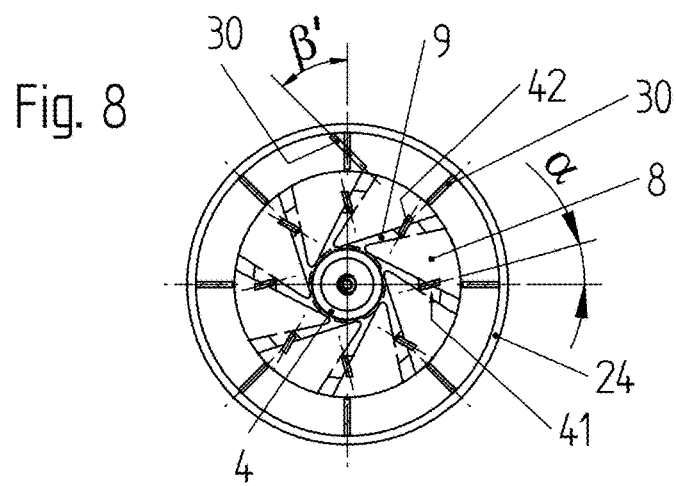
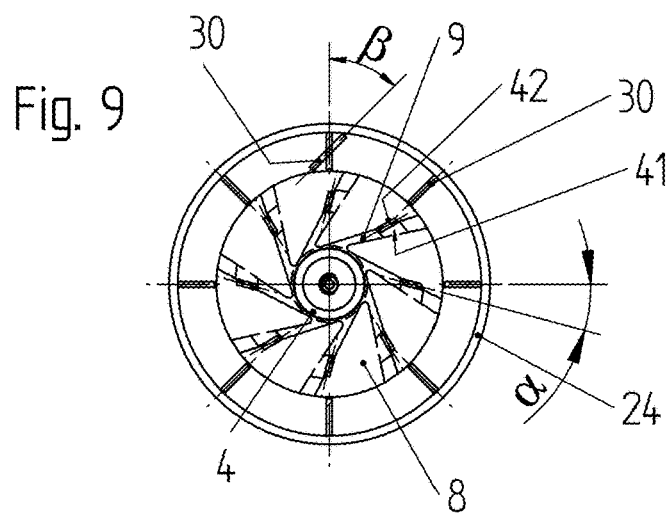

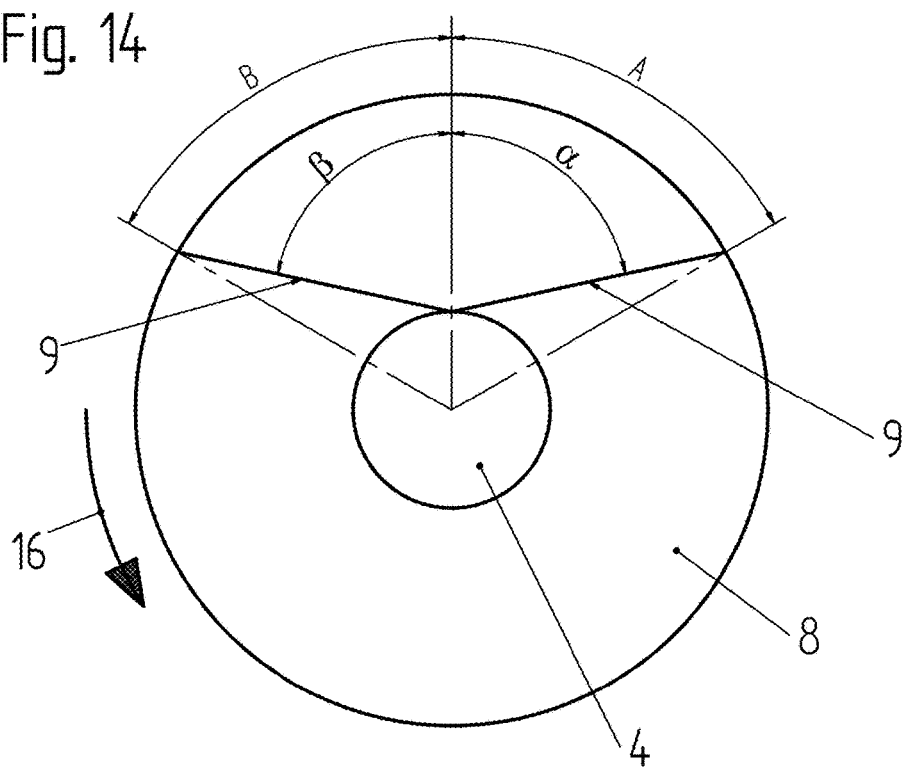

DEVICE FOR PREPARING A SUBSTANCE

FIELD OF THE INVENTION

The invention relates to a method and a device for preparing fiber-containing substance suspensions with the features of the introductory parts of the independent Claims.

BACKGROUND OF THE INVENTION

A method for preparing a substance and a device that can be used for this purpose are known from AT 510 753 B1.

In the method for preparing a substance (pulp or waste paper) that is known from AT 510 753 B1, the pulp or the waste paper is dissolved in a pulper to form a pulp suspension. In this case, the procedure is to be performed in such a way that the isolation and deflaking of the fibers is carried out by dispersing the pulp suspension, a flow is generated during dispersing in the pulp suspension, a flow is generated during dispersing to fibrillate the fibers in the pulp suspension, which flow is directed downward inside the pulp suspension and is directed outward in the lower area of the pulp suspension, the flow that is directed outward is directed against static baffles, and a shearing of the fibers of the pulp and the fibrillation are carried out in the outward-directed flow to the fibers in the pulp suspension.

The device for dispersing a pulp suspension, known from AT 510 753 B1, comprises a container, baffles that point radially into the interior of the container, a rotor provided in the container, devices on the rotor for generating a flow of the pulp suspension that is directed radially outward in the container, and a propeller for generating the flow of the pulp suspension that is directed downward.

A device for mixing, kneading, fibrillating, grinding and macerating materials is known from EP 1 287 878 A2. The known device comprises a container in which a stator is equipped with gear rims and a rotor is equipped with teeth. The teeth of the rotor interact with the teeth of the gear rims of the stator. A guide hopper, which is to concentrate the material flow moving from above to the middle area of the container, projects between the arms of the rotor. The outside surface of the guide hopper bounds an annular gap that throttles the material flow.

In the case of the device of EP 1 287 878 A2, no forcible control of the product flow is achieved by the active zone of the teeth on the rotor and stator. It is problematic in the known device that the product flow often does not reach the rotor or deviates upward from the actual operating area of the teeth on the rotor and the teeth on the stator between the rotor arms, without the product flow being affected. This means that in the case of the device according to EP 1 287 878 A2, a majority of the product flow that is to be processed circulates in an incompletely processed manner in the container.

DE 27 22 906 A1 relates to a unit for deflaking substance suspensions for paper-making machines. The unit comprises multiple deflaking devices, each of which is equipped with a stator and a rotor, which devices have interlocking rows of teeth with teeth and slots located in-between. Any measures to guide the flow path of the substance suspension for the purpose of achieving an effective and complete deflaking are not provided in the unit according to DE 27 22 906 A1.

From U.S. Pat. No. 2,823,871 A, a multi-stage mill is known, in which a steeply conical premilling zone and a flat, disk-like end-milling zone are provided. The end-milling zone comprises annular grinding elements, which are put into motion relative to one another.

SUMMARY OF THE INVENTION

The object of the invention is to further develop the method and the device of the type known from AT 510 753 B1 with respect to an improvement in the flow ratios of the suspension in the device.

In one embodiment, for example, the method according to the invention can be distinguished in that a substance suspension that is to be prepared is released from above into the flow that is directed downward inside the substance suspension.

In one embodiment, for example, the method according to the invention can be distinguished in that a prepared substance suspension of the flow that is directed upward in the outer area is removed.

In one embodiment, for example, the method according to the invention can be distinguished in that the flow that is directed outward is generated by an acceleration that is directed radially outward being exerted on the substance suspension.

In one embodiment, for example, the method according to the invention can be distinguished in that the acceleration by a rotor that is driven in rotation is transferred with a dispersing disk.

In one embodiment, for example, the method according to the invention can be distinguished in that the flow that is directed downward in the substance suspension inside the substance suspension is generated by a propeller that is driven in rotation.

In one embodiment, for example, the method according to the invention can be distinguished in that interconnecting fibers of the substance suspension are dissolved (deflaked) by thoroughly mixing the substance suspension.

In one embodiment, for example, the method according to the invention can be distinguished in that the dispersing of the substance takes place in batch operation (intermittently) or in continuous operation.

In one embodiment, for example, the method according to the invention can be distinguished in that for fibrillation, the fibers of the substance suspension are exposed to the action of shear edges and/or fins.

In one embodiment, for example, the method according to the invention can be distinguished in that the action of the shear edges and/or impact surfaces is exerted on the fibers in the area of the flow that is directed outward in the lower area.

In one embodiment, for example, the method according to the invention can be distinguished in that the substance suspension is caused to flow in a container, whereby the flow that is directed upward in the outer area is sent through an annular gap between the wall of the container and an annular displacement element that is arranged in the container.

In one embodiment, for example, the method according to the invention can be distinguished in that the substance suspension is caused to flow in a container, whereby the flow that is directed upward in the outer area is sent through at least one line that starts from the lower area of the container and one line in the upper area of the container that empties into the latter.

In one embodiment, for example, the method according to the invention can be distinguished in that the flow that is directed upward is sent through a line that runs outside of the container.

In one embodiment, for example, the method according to the invention can be distinguished in that a prepared substance suspension is removed from the line before its emptying point in the container.

In one embodiment, for example, the device according to the invention can be distinguished in that the opening of the displacement element that is coaxial with the axis of the rotor is hopper-like, whereby the expanded area of the opening points to the cover of the container.

In one embodiment, for example, the device according to the invention can be distinguished in that the stator sheets that are provided in the container are provided to project radially outward from the displacement element and to extend up to the inside of the wall of the container.

In one embodiment, for example, the device according to the invention can be distinguished in that a line for supplying a substance suspension that is to be prepared empties in the cover of the container.

In one embodiment, for example, the device according to the invention can be distinguished in that the axis of the line is oriented coaxially to the annular displacement element and to the rotor.

In one embodiment, for example, the device according to the invention can be distinguished in that in the cover, at least one, but preferably two, three or more than three, line(s) is/are provided for draining a prepared substance suspension.

In one embodiment, for example, the device according to the invention can be distinguished in that the fins on the dispersing disk increase in height from the inside to the outside.

In one embodiment, for example, the device according to the invention can be distinguished in that the fins are placed obliquely to the radial planes, which go through the axis of the rotor.

In one embodiment, for example, the device according to the invention can be distinguished in that the fins of the dispersing disk are curved.

In one embodiment, for example, the device according to the invention can be distinguished in that the rotor projects through the bottom of the container into the interior of the container.

In one embodiment, for example, the device according to the invention can be distinguished in that a circulating propeller is provided on the rotor.

In one embodiment, for example, the device according to the invention can be distinguished in that a constriction that acts as a diffuser is provided in the area of the emptying point of the line.

In one embodiment, for example, the device according to the invention can be distinguished in that the constriction is formed by an annular fin, in particular an annular fin with a triangular cross-section.

In one embodiment, for example, the device according to the invention can be distinguished in that at least one circulating line that starts from the lower area of the container and one circulating line in the upper area of the container that empties into the latter are provided.

In one embodiment, for example, the device according to the invention can be distinguished in that the circulating line has a curved area, whereby in the curved area, a nozzle is provided for the removal of a prepared substance suspension.

In one embodiment, for example, the device according to the invention can be distinguished in that shear edges and impact surfaces are designed between fins of the dispersing disk and stator teeth or stator sheets that are integral with the housing.

In one embodiment, for example, the device according to the invention can be distinguished in that the stator teeth are arranged on the displacement element.

In one embodiment, for example, the device according to the invention can be distinguished in that the stator sheets are arranged in the housing of the container.

In one embodiment, for example, the device according to the invention can be distinguished in that the stator sheets are provided in the area of the lower end of the circulating line, connected to the container, in particular in the end of said line that is preferably designed as a nozzle.

In the method according to the invention, flow ratios are achieved that produce an effective fibrillation and deflaking. In the device according to the invention, flow ratios of the substance suspension in which the flow of the substance suspension is necessarily sent via the dispersing disk are ensured by the annular displacement element that is provided in a possible embodiment in the interior of the container.

In addition, the volume is reduced by the displacement element, provided in an exemplary embodiment, in the interior of the container of the device according to the invention in such a way that a more intensive preparation of substance suspensions, in particular those that are obtained from a waste paper suspension, is achieved by the fibers in the substance suspension being isolated and deflaked more effectively by dispersing.

Also, when the device according to the invention is used, the fibrillation of the fibers takes place more effectively than previously.

Because of the shear edges and impact surfaces preferably provided with the device according to the invention, a repeated fibrillating action is achieved in the case of a single pass of the substance suspension in such a way that the output recorded is increased considerably and can be adapted to the respective substance.

The shear edges of the dispersing disk of the rotor can be placed obliquely to the radial plane or oriented radially. This also applies for the stator teeth that can be attached in a preferred embodiment to the bottom of a displacement element.

In an alternatively-provided embodiment of a device according to the invention for implementing the method, circulating lines (circulation pipes) attached on the outside are preferably provided. The circulating lines empty into the upper area of the container, so that there, a thorough mixing of freshly-supplied fibers with portions of the substance suspension already located in the circuit is ensured.

The embodiment of the device according to the invention with at least one circulating line that lies outside has the advantage of a simpler design, thus simpler producibility and weight saving.

Substance suspensions, which can be prepared with the device according to the invention, are suspensions that as a substance contain, for example:

Pulp,
Mechanical wood pulp,
Waste paper,
Primary and secondary fibers,
Fibers made from shredded articles of clothing, and
Mixtures thereof.

With the device according to the invention, an effective modification of the fibers of the substance in the substance suspension is possible by isolation, fibrillation, deflaking, etc. In this case, a fibrillation is achieved without shortening the fibers.

BRIEF DESCRIPTION OF THE DRAWINGS

Additional details and features of the device according to the invention follow from the description below of a preferred embodiment based on the drawings. Here:

FIG. 4 shows, in the section along the line A-A of FIG. 7, an embodiment of the device of FIG. 1 to FIG. 3, FIG. 5 shows a detail of the embodiment of FIG. 4 in section, FIG. 6 shows the embodiment of FIGS. 4 and 5 in cutaway oblique view, FIG. 7 shows a section along the line B-B in FIG. 4, FIG. 8 shows a modified embodiment in section along the line B-B of FIG. 4, FIG. 9 shows another embodiment in section along the line B-B of FIG. 4.

DETAILED DESCRIPTION OF THE INVENTION

Figure 2:
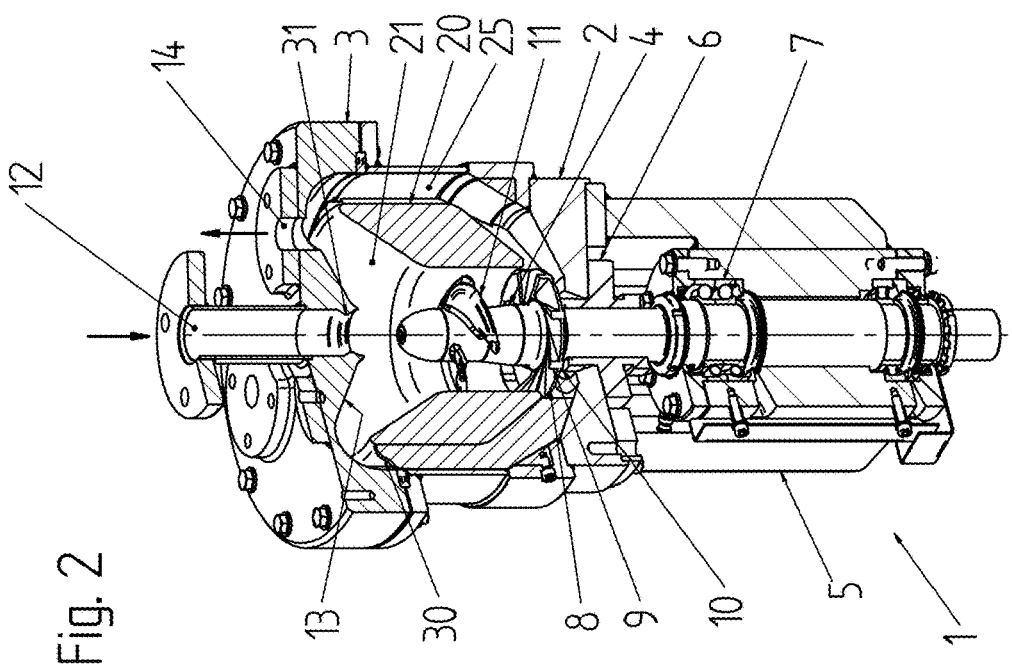
FIG. 2 shows the device of FIG. 1 in cutaway oblique view.

A device 1 according to the invention comprises a container 2, which is closed on its top by a cover 3. A rotor 4, which is mounted in a bearing body 5 arranged below the container 2, projects from below into the container 2.

The bushing of the rotor 4 in the container 2 is sealed by sliding-ring seals 6.

The rotor 4 is mounted in the bearing body 5 by roller bearings 7.

In its part arranged in the lower area of the container 2, the rotor 4 carries a dispersing disk 8, which has fins 9, 10 on its top and on its bottom, fins that are tilted relative to the radial direction. In this case, the orientation of the fins 9, 10—as diagrammatically depicted in FIG. 14—is selected relative to the direction of rotation of the rotor 4 in one embodiment in such a way that their radial inner ends lie further forward relative to the direction of rotation (arrow 14 in FIG. 14) (distance A) than the radial outer ends of the fins 9, 10. This applies for the fin 9 and/or 10 that is indicated by way of example in FIG. 14, which fin encompasses an acute angle α with its radial plane R.

In a modified embodiment that is also depicted in FIG. 14, the fin 9 and/or 10 that is depicted by way of example in FIG. 14 is oriented in such a way that its radial outer end, relative to the direction of rotation (arrow 16 in FIG. 14), lies further back (distance B) than its radial inner end. This fin 9 and/or 10 encompasses the acute angle β with the radial plane R.

Moreover, the fins 9 and/or 10 can increase in height from inside to outside.

The fins 9 on the top of the dispersing disk 8 and/or the fins 10 on the bottom of the dispersing disk 8 are curved, for example. Curved fins 9 and/or 10 are either oriented so that the convex side of the fins 9/10 relative to the direction of rotation (arrow 16) of the dispersing disk 8 points forward or are oriented in such a way that the convex side, relative to the direction of rotation (arrow 16) of the dispersing disk 8, points backward.

The fins 9 on the top of the dispersing disk 8 and/or the fins 10 on the bottom of the dispersing disk 8 can thus also be curved in such a way that the concave side of the fins 9/10 relative to the direction of rotation (arrow 16) of the dispersing disk 8 points forward or backward.

The fins 9 on the top of the dispersing disk 8 and/or the fins 10 on the bottom of the dispersing disk 8 can also be straight fins.

In one embodiment (FIG. 3), a propeller 11 with blades is provided on the rotor 4 above the dispersing disk 8, which propeller generates a flow that is directed downward to the dispersing disk 8 in the substance suspension that is to be prepared. The propeller 11 is not necessarily provided since a sufficiently defined flow of the substance suspension is achieved even without propeller 11 by the design according to the invention of the device 1 with the displacement element 20, still to be explained.

In the cover 3, a line 12, through which the substance suspension that is to be prepared flows into the container 2, empties coaxially to the rotor 4.

On the inside of the cover 3, a cone-shaped projection 13 that points inward is provided, a projection in whose center the substance-suspension supply line 12 empties.

This arrangement of the line 12 produces an optimal mixing of the substance suspension, which is located in the circuit in the container 2 with substance suspension that is newly fed into the container 2.

Because, at the end of the line 12 (emptying point in the container 2), there is a constriction 31 acting as a diffuser (formed by an annular fin that is triangular in cross-section), the above-mentioned mixing of the supplied substance suspension with a substance suspension that is already in the container 2 and is being prepared is advantageously supported.

In the embodiment that is shown, three drain lines 14 encircling the supply line 12 are provided for draining a prepared pulp suspension.

The cover 3 is bolted to the container 2 (screws 15).

In the interior of the container 2, an annular displacement element 20 is provided, whose inner opening 21 is designed approximately hopper-like. Between the outside surface 22 of the displacement element 20 and the interior 23 of the wall 24 of the container 2, an annular channel 25 is provided, in which a substance suspension that is to be prepared flows upward after leaving the dispersing disk 8. A substance suspension, optionally supported by the propeller 11 on the rotor 4, flows through the hopper-like inner opening 21 of the displacement element 20 downward in the direction toward the dispersing disk 8.

In the embodiment that is shown, the upper end of the rotor 4 is covered by a formed covering 17 that promotes flow and that is immobilized in the rotor 4 using a hexagon socket 18.

On the exterior of the displacement element 20, stator sheets 30, which span the annular channel 25 (gap) between the exterior 22 of the displacement element 20 and the interior 23 of the wall 24 of the container 2 (in particular in its lower part), i.e., with its free edges adjoin the interior 23 of the wall 24 of the container 2, are provided as baffles.

In order to hold the displacement element 20 in the interior of the container 2, fastening screws 28 can be provided (cf. FIGS. 2 and 3).

During operation of the device, a product (a substance suspension that is to be prepared) is fed via the line 12 in such a way that a freshly-introduced substance suspension is mixed with the substance suspension that circulates in the container 2 in the direction of the arrows. Thus, it is ensured that no short-circuiting occurs in the case of the freshly-introduced substance suspension directly flowing out again from the device 1 via the outlet lines 14 without a preparation of the substance suspension having taken place.

Figure 1:
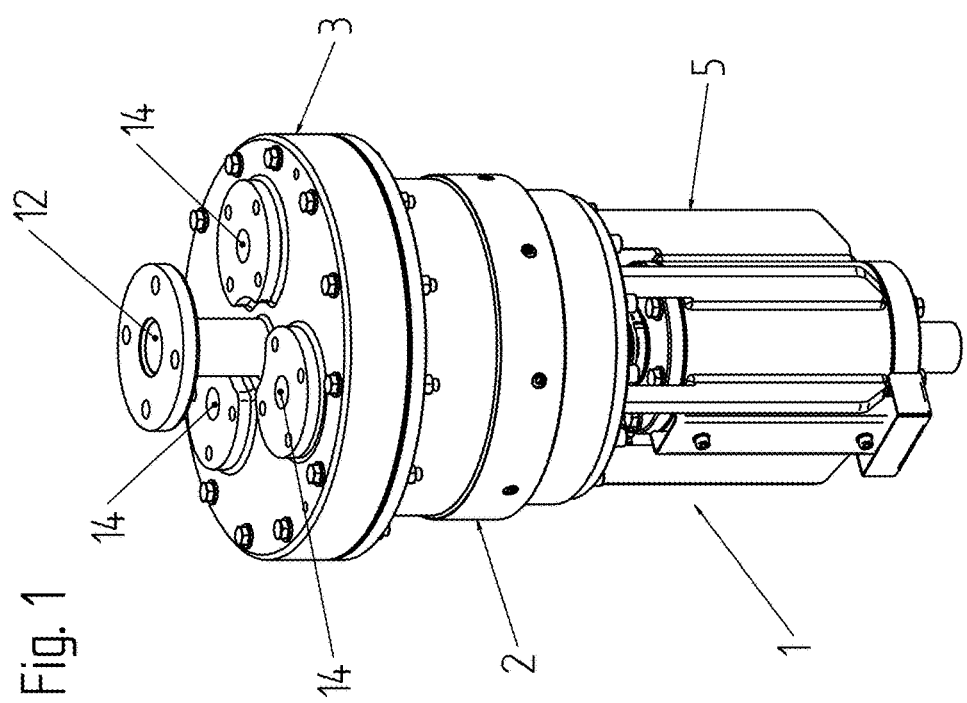
FIG. 1 shows a device according to the invention in oblique view.
Figure 3:
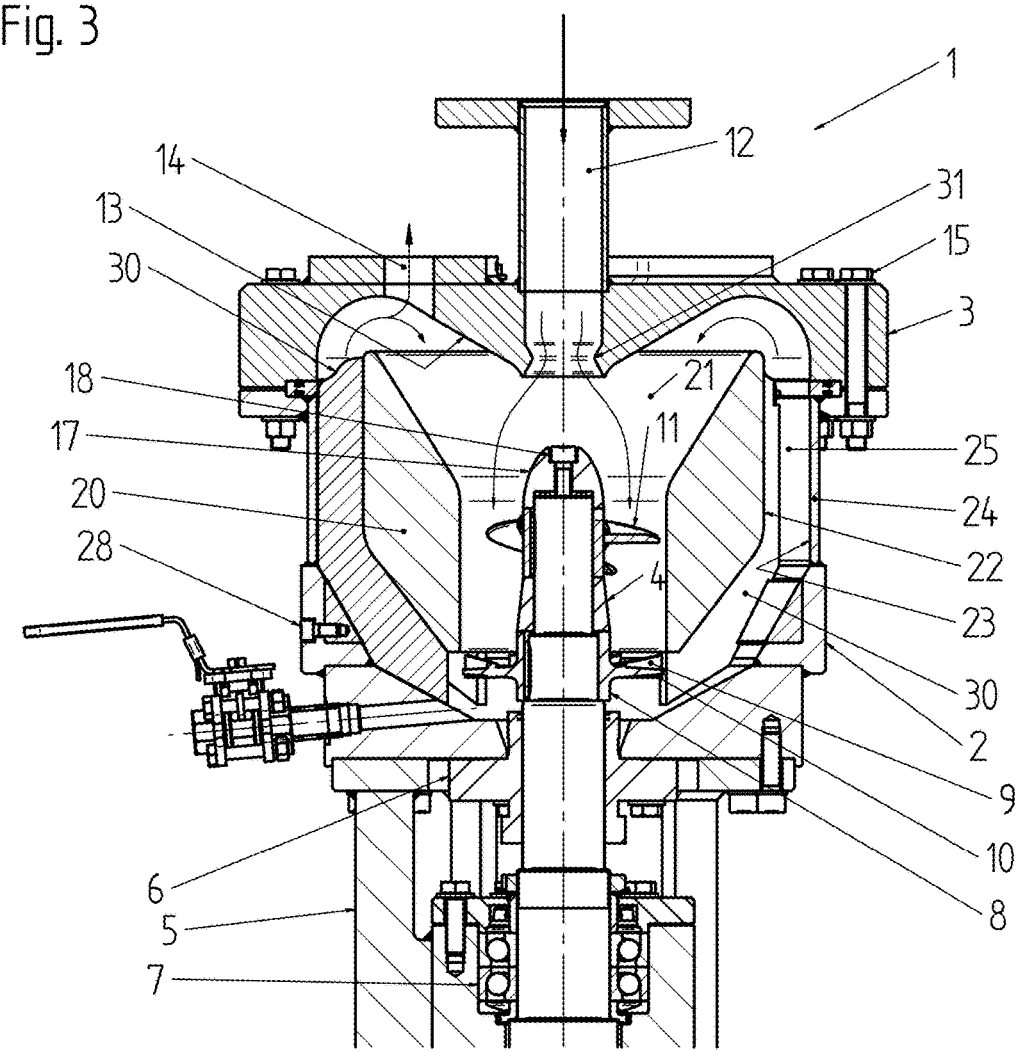
FIG. 3 shows, partially in axial section, the device of FIG. 1 with drawn-in flow ratios.
Figure 10:
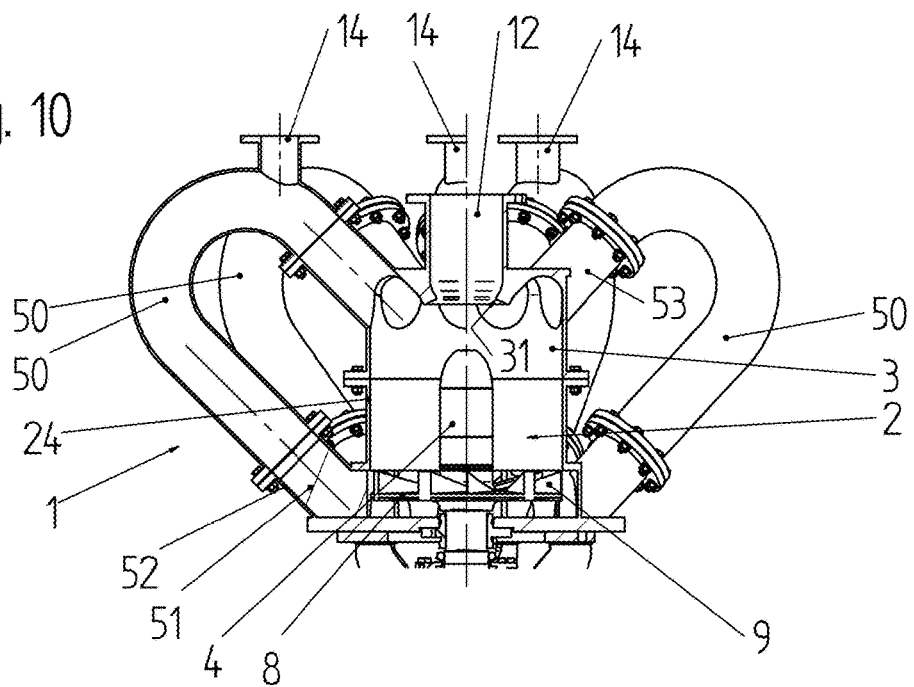
FIG. 10 shows, in section along the line D-D of FIG. 12, another embodiment of a device according to the invention.
Figure 11:
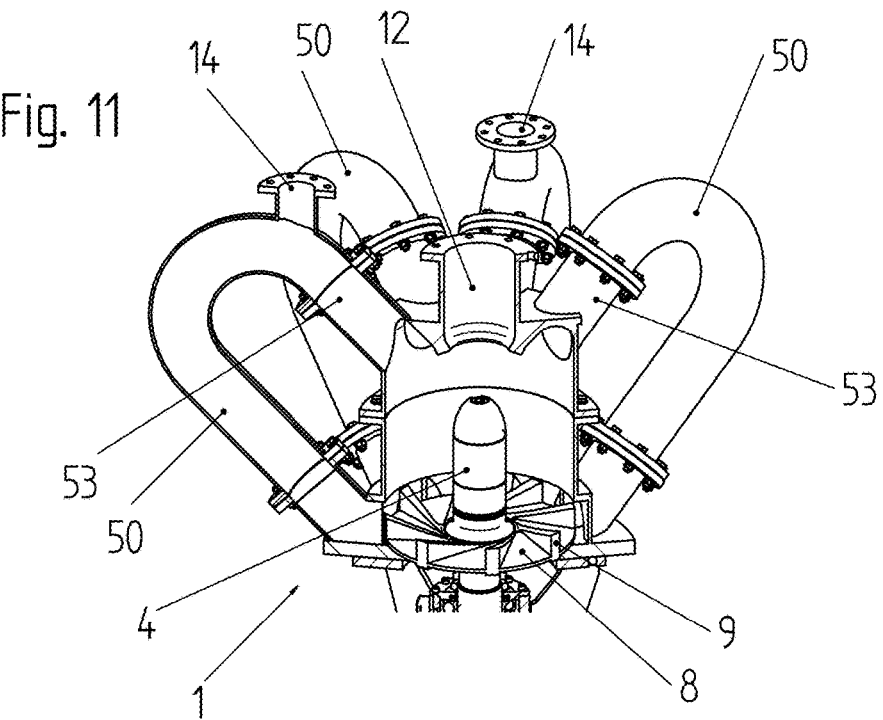
FIG. 11 shows, in cutaway oblique view, the embodiment of the device of FIG. 10.
Figure 12:
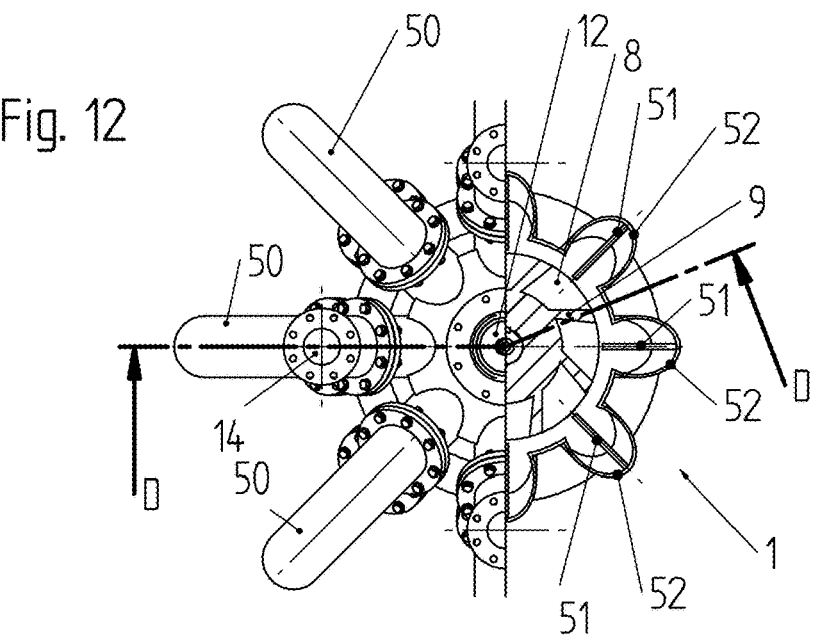
FIG. 12 shows, in section along the line C-C of FIG. 10, the embodiment of the device of FIGS. 10 and 11.
Figure 13:
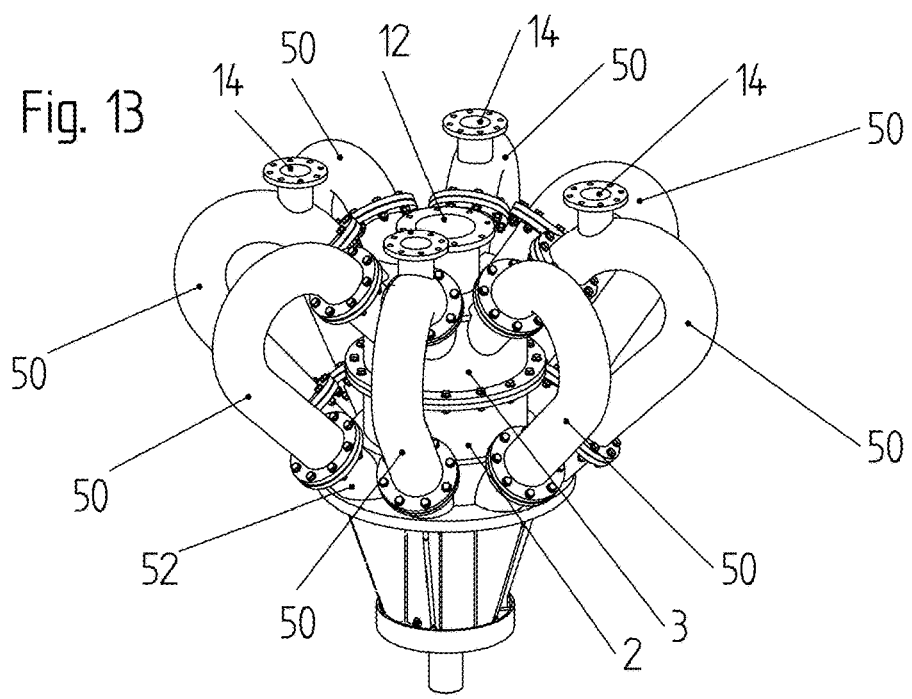
FIG. 13 shows, in oblique view, the embodiment of the device according to FIGS. 10 to 12, and FIG. 14 diagrammatically shows two possible orientations of fins at the dispersing disk of the rotor.

The embodiment of a device according to the invention shown in FIGS. 4 to 9 essentially corresponds to the embodiment of FIGS. 1 to 3.

In the embodiment according to FIGS. 4 to 9, a larger number of active shear edges and impact surfaces are provided, although the dimensions of the rotor 4 can essentially remain the same. To this end, the fins 9 on the rotor 4 or the dispersing disk 8 are interrupted, so that an "annular groove" 40 (formed by the annular series of interruptions 41) that is concentric to the axis of the rotor 4 is produced. Stator teeth 42, which are arranged on the bottom of the displacement element 20, engage in this annular groove 40. In this embodiment, the substance fibers travel past shear edges and impact surfaces having a fibrillating action in a single pass through the rotor/stator unit in such a way that the power input is considerably increased. Moreover, it is possible, by selection of the arrangement with dimensions of the interruptions 41 in the fins 9 on the dispersing disk 8 of the rotor 4, on the one hand, and the stator teeth 42 on the displacement element 20, on the other hand, to select the distance between the individual working surfaces adapted to the product (substance suspension) that is to be processed in each case.

As shown in FIGS. 8 and 9, the stator sheets 30 on the displacement element can be directed forward or backward, i.e., be tilted toward the radial planes or run radially (FIG. 7). Thus, the innermost ring that consists of parts of the fins 9 arranged in an annular manner can have shear edges directed backward, and the outer ring that consists of parts of the fins 9 arranged in an annular manner can have shear edges directed forward. Correspondingly, the same applies for the stator teeth 42 on the bottom of the displacement element.

The latter can be arranged at different working angles β, as is diagrammatically depicted in FIGS. 7 to 9.

The number of fin parts arranged in an annular manner on the dispersing disk 8, on the one hand, and the stator teeth 42 on the bottom of the displacement element 20, on the other hand, can be selected adapted to the respective product.

In the embodiments of a device according to the invention, shown in FIGS. 1 to 3 and 4 to 9, which embodiments are suitable for carrying out the method according to the invention, the flow of the substance suspension that is directed upward is sent physically separated from the flow that is directed downward, whereby the physical separation is achieved by the displacement element 20 by the substance suspension flowing upward through the annular gap in the form of the annular channel 25 (interrupted by the stator sheets 30), annular gap formed between the wall of the container 2 and the outside surface of the displacement element 20.

The embodiment of a device according to the invention that is shown in FIGS. 10 to 13 is designed without displacement elements 20 of the embodiments of FIGS. 1 to 9. The flow of the substance suspension that is directed upward is carried out in the embodiment of the device according to FIGS. 10 to 13 by circulating lines 50 (circulation pipes) that empty starting from the lower area of the container 2 into the upper area (e.g., the cover 3) of the container 2. In the embodiment shown in FIGS. 10 to 13, stator sheets 51 are provided as baffles in the area of the emptying points of the pipes that form the circulating lines 50 in the lower area of the container 2. These stator sheets 51 are arranged in nozzles 52, which are connected to the wall 24 of the container 2.

The circulating lines 50 that are bent in the shape of a U are connected in the upper area via nozzles 52 to the upper area (e.g., to the cover 3) of the container 2, in such a way that a substance suspension that flows through the circulating lines 50 is mixed with the substance suspension that is to be processed, released by the product feed 12.

In each or in selected circulating lines 50, nozzles 14 for drawing off (removing) a prepared substance suspension are provided. The pipes that are used as circulating lines 50 can be connected using flanges, quick-release closures or clamping sets to nozzles 52 and 53 of the container 2.

In the area of the product feed 14, the circulating lines 50 empty into the container 2, so that a thorough mixing of freshly-supplied substance suspension with fibers that are already located in the container 2 in the circuit is ensured.

During operation of the device 1, a pressure that corresponds to the system pressure in the line 12 for the substance suspension is maintained in the container 2 and in the supply and drain lines 12, 14.

The dwell time of the substance suspension in the container 2 is regulated, for example, in that a substance suspension that is still to be prepared is fed only when the substance suspension that is present in the container 2 has been prepared in finished form, i.e., the fibers have been isolated and deflaked in the suspension by dispersing, and whereby fibrillation of the fibers has also been carried out. The dwell time of a substance suspension in the container 2 is determined, for example, by the ratio of the amount of substance suspension to freshly-supplied substance suspension that is located in the circuit and the aggregate rotation speed (dispersing disk 8).

The flow that prevails in the container has a circulating rate that is higher by a multiple than the substance suspension that continuously flows through. Thus, a repeated circulation of the substance suspension in the container is ensured. The fractional amount of the substance fibers, which actually flows through the fibrillating zone only a few times, is negligibly minimized before the latter leaves the machine via the discharge channels. There is thus almost no negative effect on the fibrillation result from non-optimally-fibrillated fibers.

With the device 1 according to the invention, it is possible, with high efficiency, during preparation of, for example, pulp, to separate from one another, by deflaking, fibers that are still held together by conglomerates of fibers being dissolved.

In addition, in the device 1 according to the invention, fibrillation of the fibers is achieved by fanning out the individual fibers, which is done by rubbing the fibers against one another and by the action of centrifugal forces.

In summary, an embodiment of the invention can be described as follows:

A device 1 for preparing a substance suspension, in particular a pulp suspension, with a container 2, with stator sheets 30 provided in the interior of the container 2 and designed as baffles, and with a rotor 4 provided in the container 2, on which rotor a dispersing disk 8 is provided, comprises an annular displacement element 20 that is provided in the interior of the container 2, an element whose outside surface 22 is some distance from the inside surface 23 of the wall 24 of the container 2. The inner opening 21 of the displacement element 20 that is arranged coaxially to the rotor 4 is hopper-like, whereby the expanded area of the opening points to the cover 3 of the container 2. The stator sheets 30 that are provided in the container 2 span the channel 25 between the exterior 22 of the displacement element 20 and the interior 23 of the wall 24 of the container 2.

The invention claimed is:

1. A method for preparing a fiber-containing substance suspension, comprising:

fibrillating and deflaking fibers from the fiber-containing substance suspension by dispersing, wherein during dispersing in the substance suspension, a flow of substance suspension is generated in a container in which an annular displacement element is arranged and is surrounded by an inside surface of a wall forming the container, the flow being directed downward inside the substance suspension, outward toward an outer area the substance suspension in a lower area of the substance suspension, and upward in the outer area of the substance suspension, and wherein the flow that is directed upward in the outer area of the substance suspension is sent through an annular gap formed between the inside surface of the wall forming the container and the annular displacement element such that the flow that is directed upward in the outer area of the substance suspension is sent physically separated from the flow that is directed downward inside the substance suspension by the annular displacement element.

2. The method according to claim 1, wherein a newly fed portion of substance suspension that is to be prepared is released into the substance suspension from above the upper area of the substance suspension and into the flow that is directed downward inside the substance suspension.

3. The method according to claim 1, wherein a prepared substance suspension of the flow that is directed upward in the outer area is removed.

4. The method according to claim 1, wherein the flow that is directed outward is generated by a radial acceleration that is directed outward being exerted on the substance suspension.

5. The method according to claim 4, wherein the radial acceleration is transferred by a rotor, driven in rotation, with a dispersing disk.

6. The method according to claim 1, wherein the flow that is directed downward inside the substance suspension is generated by a propeller, driven in rotation.

7. The method according to claim 1, wherein interconnecting fibers of the substance suspension are deflaked by thorough mixing of the substance suspension.

8. The method according to claim 1, wherein the dispersing takes place in a batch operation in an intermittent manner or in a continuous operation.

9. The method according to claim 1, wherein for fibrillating, the fibers of the substance suspension are exposed to the action of shear edges and/or fins.

10. The method according to claim 9, wherein the action of the shear edges and/or impact surfaces is exerted on the fibers in an area of the flow that is directed outward in the lower area.

* * * * *